United States Patent [19]
Horton et al.

[11] Patent Number: 5,819,206
[45] Date of Patent: *Oct. 6, 1998

[54] METHOD AND APPARATUS FOR DETERMINING POSITION AND ORIENTATION OF A MOVEABLE OBJECT USING ACCELEROMETERS

[75] Inventors: Mike A. Horton, Berkeley; A. Richard Newton, Woodside, both of Calif.

[73] Assignee: Crossbow Technology, Inc., San Jose, Calif.

[ * ] Notice: The term of this patent shall not extend beyond the expiration date of Pat. No. 5,615,132.

[21] Appl. No.: 820,837

[22] Filed: Mar. 20, 1997

Related U.S. Application Data

[63] Continuation of Ser. No. 184,583, Jan. 21, 1994, Pat. No. 5,615,132.

[51] Int. Cl.[6] ........................................ G09G 3/02
[52] U.S. Cl. .......................... 702/150; 703/702; 367/436; 701/207
[58] Field of Search .................................. 364/559, 410, 364/449, 516, 517, 453, 578; 340/988, 989, 990; 351/210, 209; 395/502, 500; 434/29, 43, 49

[56] References Cited

U.S. PATENT DOCUMENTS

| | | | |
|---|---|---|---|
| 5,072,218 | 12/1991 | Spero et al. | 340/980 |
| 5,245,537 | 9/1993 | Barker | 364/453 X |
| 5,280,265 | 1/1994 | Kramer et al. | 338/210 |
| 5,290,964 | 3/1994 | Hiyoshi et al. | 84/600 |
| 5,307,072 | 4/1994 | Jones, Jr. | 342/147 |
| 5,373,857 | 12/1994 | Travers et al. | 128/782 |
| 5,422,653 | 6/1995 | Maguire et al. | 345/9 |
| 5,583,875 | 12/1996 | Weiss | 371/28 |
| 5,615,132 | 3/1997 | Horton et al. | 364/516 |

OTHER PUBLICATIONS

Shetty et al., image–sensor–based target maneuver detection; Optical Engineering vol. 32, n. 11, pp. 2735–2740, Nov. 1993.

Guedry et al., tThe dynamic of spatial orientation during complex and changing linear and angular acceleration, Journal of Vestibular Research:Equilibrium and Orientation, vol. 2, No. 4, pp. 259–283, Nov. 1992.

A Gelb et., "Applied optimal Estimation", The M.I.T. Press, pp. 50–143, 1974.

North Atlantic Treaty Organization, Agard Lecture Series No. 82 "Practical Aspects of Kalman Filtering Implementation", pp. 2–1 through 2–11, 1976.

(List continued on next page.)

*Primary Examiner*—Kamir Shah
*Assistant Examiner*—Kamini Shah
*Attorney, Agent, or Firm*—Fenwick & West LLP

[57] ABSTRACT

A three-dimensional position and orientation tracking system uses accelerometers to measure acceleration of a moveable object (e.g., a head-mounted display unit or a data glove). A tracking processor generates both position and orientation information on the object relative to a simulation environment as a function of the acceleration data. In one embodiment, a simplified radar-based tracking system is disposed relative to the object and periodically provides additional tracking data on the object to the tracking processor. The tracking processor uses the additional data to correct the position and orientation information using a feedback filter process. The position and orientation information signals generated can be used, for example, in a simulation or virtual reality application. Position and orientation information is received by a simulation processor relative to the object. The simulation processor modifies a simulation environment as a function of the position and orientation information received. Modified simulation environment information (e.g., video and/or audio information) is then presented to a user.

16 Claims, 9 Drawing Sheets

OTHER PUBLICATIONS

Analog Devices product specification for Model ADZL50*, "Monolithic Accelerometer with signal conditioning", pp. 1–16, Jan. 1993.

J.A. Adam, "Virtual Reality is for Real", IEEE Spectrum, pp. 22–29, Oct. 1993.

3 Space Fastrak Product specifications by PDLHEM US; Jul. 1992.

GDMulti–Receiver/Transmitters Tracking Device, A Flock of Birds Product Specification by Asension Tech. Corp. ACT, Nov. 1992.

METHOD AND APPARATUS FOR DETERMINING POSITION AND ORIENTATION OF A MOVEABLE OBJECT USING ACCELEROMETERS

This is a continuation of application Ser. No. 08/184,583 filed on Jan. 21, 1994, U.S. Pat. No. 5,615,132.

BACKGROUND OF THE INVENTION

1. Field of the Invention

The invention relates to tracking systems, particularly to such systems that determine position and orientation of an object in a limited volume using accelerometers.

2. Description of the Background Art

In specialized computer applications involving virtual reality or "immersive simulations" a computer or processing facility providing the simulation must continuously determine with a high degree of accuracy the position and orientation of a user (or part of the user e.g., head or hand) relative to a "virtual world" or simulated environment in which the user operates. The position and orientation data must be updated regularly to provide a realistic simulation. In addition, the data must be collected in a manner that does not interfere significantly with the user's natural movement. Thus, physical connection to a stationary object or heavy and/or bulky tracking instruments attached to the user are unsuitable. In order to be integrated easily with a head-mounted display (HMD), data glove or other peripheral device for use in a virtual reality application, a tracking system must be small and light weight.

A mechanical gantry containing sensors is used to track movement by physically connecting the user to a fixed object. However, this system is cumbersome, provides an unrealistic simulation due to interferences from the gantry, and requires significant installation effort.

A simplified radar or sonar system having a transmitter and a receiver mounted on the user is used to determine position of an object. However, this type of system is sensitive to noise in the environment, tends to have high frequency jitter between position measurements, is subject to interference from other objects in the simulation (e.g., a hand or other users), is generally bulky, requires multiple transmitters and receivers, and may be quite complex and expensive. Such systems are embodied in products available commercially from Polhemus, Logitech, and Ascension Technology.

Additionally, conventional navigation systems for navigating over large areas of land or airspace such as those for planes, cars, missiles, use devices such as gyroscopes that are not suitable for attachment to a human user because of their size and weight. In addition, these devices are typically designed to track over several hundred kilometers and several days, and are accurate only to several meters.

Two-dimensional navigation systems using angular accelerometers (a type of gyroscope), such as that used in Barber U.S. Pat. No. 5,245,537, are not suitable for virtual reality applications requiring three position and three orientation measurements for realistic simulation. The system described in Barber does not provide a highly accurate measurement (as required by virtual reality applications) because it contains no mechanism for correcting errors that are inherent in the system (e.g., bias, calibration errors, floating, and positional errors). Left uncorrected, these errors typically increase in size as a function of time of use and/or volume traversed, thereby resulting in a significant degradation in system performance. Moreover, angular accelerometers are not easily integrated into electronic componentry, thus the resulting system is generally greater in size and weight and is not suitable for attachment to a human user. In addition, a much higher update rate (e.g., 50–300 Hz) than that used in Barber is required for realistic virtual reality simulations.

Thus, there is a need for a small, lightweight, highly integratable, navigational system that can be easily attached to a human user without significant interference to natural body movement. Furthermore, there is a need for a navigational system that is highly accurate over a long period of time and operates at a high update rate in order to provide a realistic virtual reality simulation. The prior art has failed to address these needs adequately.

SUMMARY OF THE INVENTION

The invention is a three-dimensional position and orientation tracking system that uses accelerometers to measure acceleration in the six-degrees of freedom (e.g., x, y, z position coordinates and roll, pitch, yaw orientation components) of a moveable object (e.g., a head-mounted display unit, or a wristband/data glove). Conventional accelerometers, as used herein, measure acceleration in one linear direction (e.g., x, y, z, or combination thereof, coordinate axis), but may report acceleration data as a nonlinear function of, for example, acceleration or time. Acceleration data on the moveable object is periodically (e.g., 50–300 Hz) received by a tracking processor. The tracking processor generates both position and orientation information on the object relative to a simulation environment as a function of the acceleration data. Accelerometers are easily integrated into electronic componentry (e.g., using is silicon chip technology). Thus, the tracking system of the present invention can be embodied in a small, lightweight unit that is easily attached to a human user without significant interference to natural body movements.

In one embodiment, a simplified radar-based tracking system, which is disposed relative to the object, periodically (e.g., 1 Hz) provides additional tracking data on the object to the tracking processor. This data may be provided by, for example, infrared light and received by the tracking processor via an infrared sensor. The tracking processor uses the additional data to correct the position, orientation, and/or velocity information generated from the accelerometers, using a feedback or Kalman filter process. This correction feedback loop allows the invention to function accurately over a long period of time (e.g., several hours) without adjustment. Alternatively, if the user is to remain seated or confined to a limited volume during simulation, pre-defined position data from the simulation environment software specification (e.g., mean position of user and average variance) can be used in the correction feedback process.

The position and orientation information signals generated can be used, for example, in a simulation or virtual reality application. Position and orientation information is received by a simulation processor relative to the object (e.g., via infrared transceiver). The simulation processor modifies a simulation environment operating on the simulation processor as a function of the position and orientation information received. Modified simulation environment information (e.g., video, audio, tactile, and/or olfactory information) is transmitted back to the user (e.g., via infrared transceiver). Other possible applications of the invention include guidance systems for the blind, robotic guidance systems, human tracking systems (e.g., prisoners), object tracking systems (e.g., parcel package, and/or auto), and computer input devices for the handicapped (e.g., head or hand controlled input devices).

DESCRIPTION OF THE PREFERRED EMBODIMENT

Figure 1:
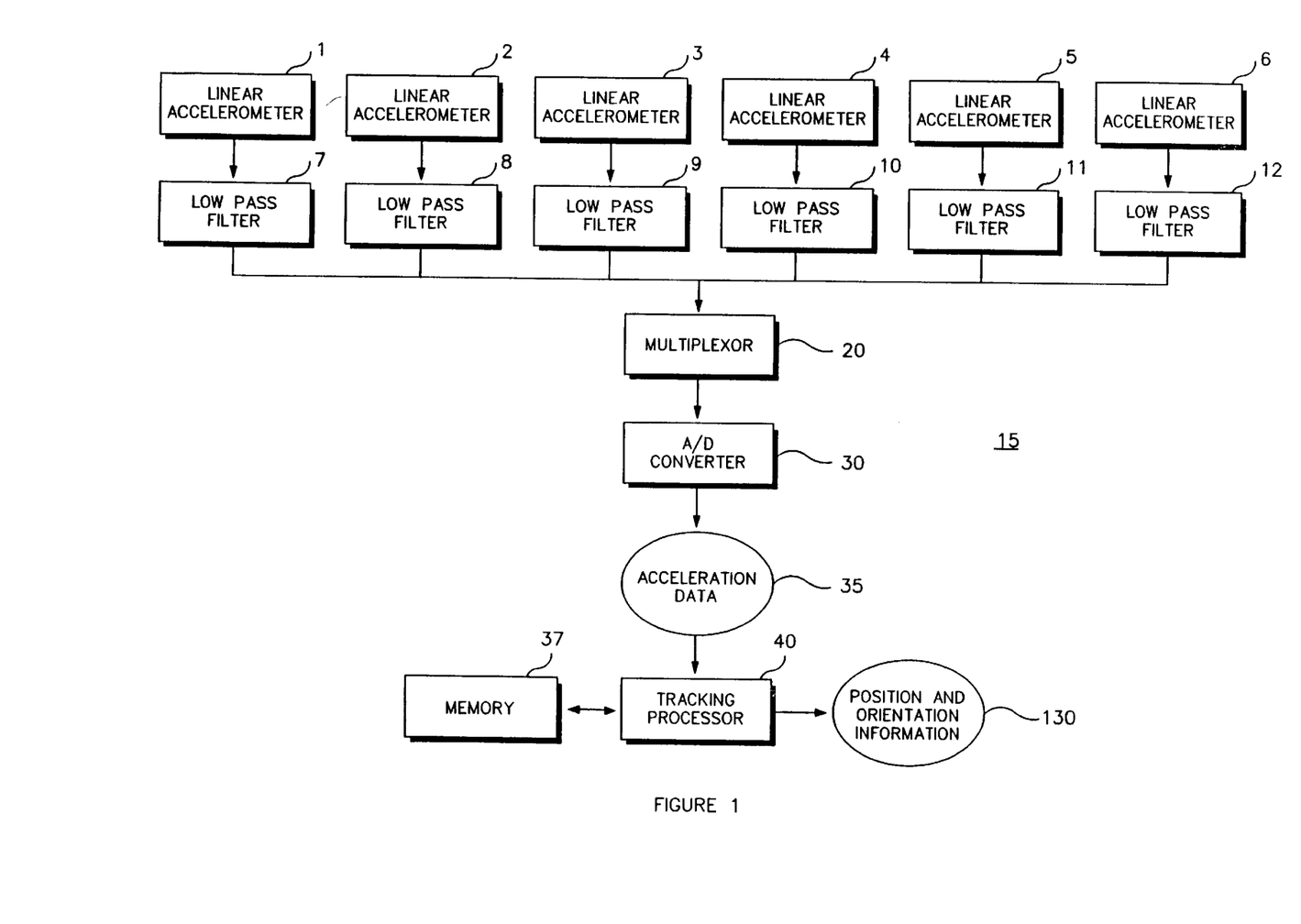
FIG. 1 is a simplified block diagram illustrating the components used in the tracking system of the present invention.

FIG. 1 is a simplified block diagram illustrating the components used in the tracking system invention. Conventional accelerometers 1–6 measure acceleration in one linear direction (e.g., x, y, z, or combination thereof, coordinate direction), but may report acceleration data, for example, as a nonlinear function of time (e.g., v(t), where v is voltage) or acceleration. Accelerometers 1–6 are capable of measuring accelerations of at least ±2 G. This allows for 1 G due to gravity and 1 G of movement acceleration. In the preferred embodiment, accelerometers should be shock-protected or resistant so that they are not damaged if dropped. To ensure high accuracy, a high signal to noise ratio (SNR) is desirable—a lower bound of approximately $10^2$ or 40 dB is preferred.

In one embodiment six accelerometers 1–6 are used to track six degrees of freedom of an object in three dimensions (e.g., x, y, z position coordinates and roll, pitch, yaw orientation components). More than six accelerometers can be used to obtain a greater degree of accuracy (e.g., by averaging or interpolation) and/or redundancy. Alternatively, three dual-axis or two triaxial accelerometers can be employed to track the six degrees of freedom of an object in three dimensions. Fewer accelerometers (e.g., four) could be used to track the object, for example, in a two-dimensional space or one-dimensional space (e.g., two accelerometers). Groups or clusters of accelerometers can also be used to track a plurality of objects. For example, the tracking invention could be implemented on an HMD and two data gloves to track head and hand movement of a user. More tracking systems can be used along the arm to track elbow and shoulder movement. Tracking systems on each finger could also be used to track finger movement. Similarly, two head-mounted display (HMD) units with six accelerometers each could be used to track the 3-dimensional position and orientation of two interactive users in a virtual reality environment.

Accelerometers 1–6 are conventional accelerometers such as the ADXL-2 manufactured by Analog Devices Corp. of Boston, Mass. Due to the nature of human movement (typically frequency components are between 0–50 Hz), for example, there is generally little information in the high frequency range, and this information should be removed to reduce noise. Accordingly, in the preferred embodiment, accelerometers are bandlimited, i.e., the highest frequency from accelerometers 1–6 are limited to, for example, 50–300 Hz. This bandwidth can be achieved by coupling accelerometers 1–6 to low pass filters (LPFs) 7–12, respectively, or by using low bandwidth accelerometers. In a preferred embodiment, accelerometers 1–6 are small and easily integrated with other electronic components, e.g., small micro-machined accelerometers (bulk or surface micro-machined).

Output from LPFs 7–12 are used as inputs to multiplexer 20 such as the ADG508A available commercially from Analog Devices. Analog to digital (A/D) converter 30, such as the AD1380 available commercially from Analog Devices, is used to convert the analog acceleration signal from LPFs 7–12 to a digital signal. Some accelerometers can provide digital data directly (see e.g., ARPA grant #BAA93-06 to University of California at Berkeley and Analog Devices) thus A/D converter 30 is not necessary. Alternatively, a voltage-to-frequency converter and a frequency counter circuit could be used to obtain a digital value. The components of the present invention comprising accelerometers 1–6, LPF 7–12, multiplexer 20, and A/D converter 30 are all highly integratable (unlike gyroscopes, angular accelerometers, and other tracking systems). Thus, according to the present invention, for example, accelerometers 1–6 (or subset thereof), multiplexer 20, A/D converter 30, and tracking processor 40 could all be co-located on a single integrated computer chip—the result being a small lightweight navigational system suitable for attachment to human users using a virtual reality application.

Output from A/D converter 30 is acceleration data 35. Acceleration data 35 may be reported, for example, as a nonlinear function of time (e.g., v(t) where v is volts). Acceleration data 35 is input to tracking processor 40. Tracking processor 40 can be, for example, a standard computer microprocessor such as an INTEL 486, Motorola 68000, or Pentium-based microprocessor. Tracking processor 40 is discussed in further detail with reference to FIGS. 3–5 below. Memory unit 37 is coupled to tracking processor 40 and is used for storing program instruction steps and storing data for execution by tracking processor 40. Memory unit 37 is a conventional computer memory unit such as a magnetic hard disk storage unit or random access memory (RAM) on a chip. Output from tracking processor 40 is position and orientation information 130.

In one embodiment, position and orientation information 130 is transmitted in a data signal consisting of six elements—three position elements (e.g., x, y, z) and three orientation elements (e.g., roll, pitch, yaw). Each element is two bytes long. Each value or element is in twos complement format, thus the decimal values −32,768 to 32,767 are covered. Measurements are the decimal value divided by 100. Thus, measurements from −327.68 to 327.67 (e.g., degrees, cm, inches, feet or other angle or linear measurements) can be transmitted. Information 130 is transmitted in a standard serial interface of three lines—transmit, receive, and ground—standard 8 bit words, no parity, and 1 stop bit. A mode of operation can be specified as follows:

R—request mode (default). Position and orientation is transmitted upon request.

F—free running mode. Position and orientation is transmitted as calculated.

M—mode change. Informs tracker that mode in which position and orientation is transmitted (R or F) will change.

G—get data. Tracker will transmit position and orientation information 130.

H—halt. Turns off tracking system.

C—calibrate. Runs or reruns the initialization routine 48. Alternatively, a file can be created with records of the same format described above.

Figure 2:
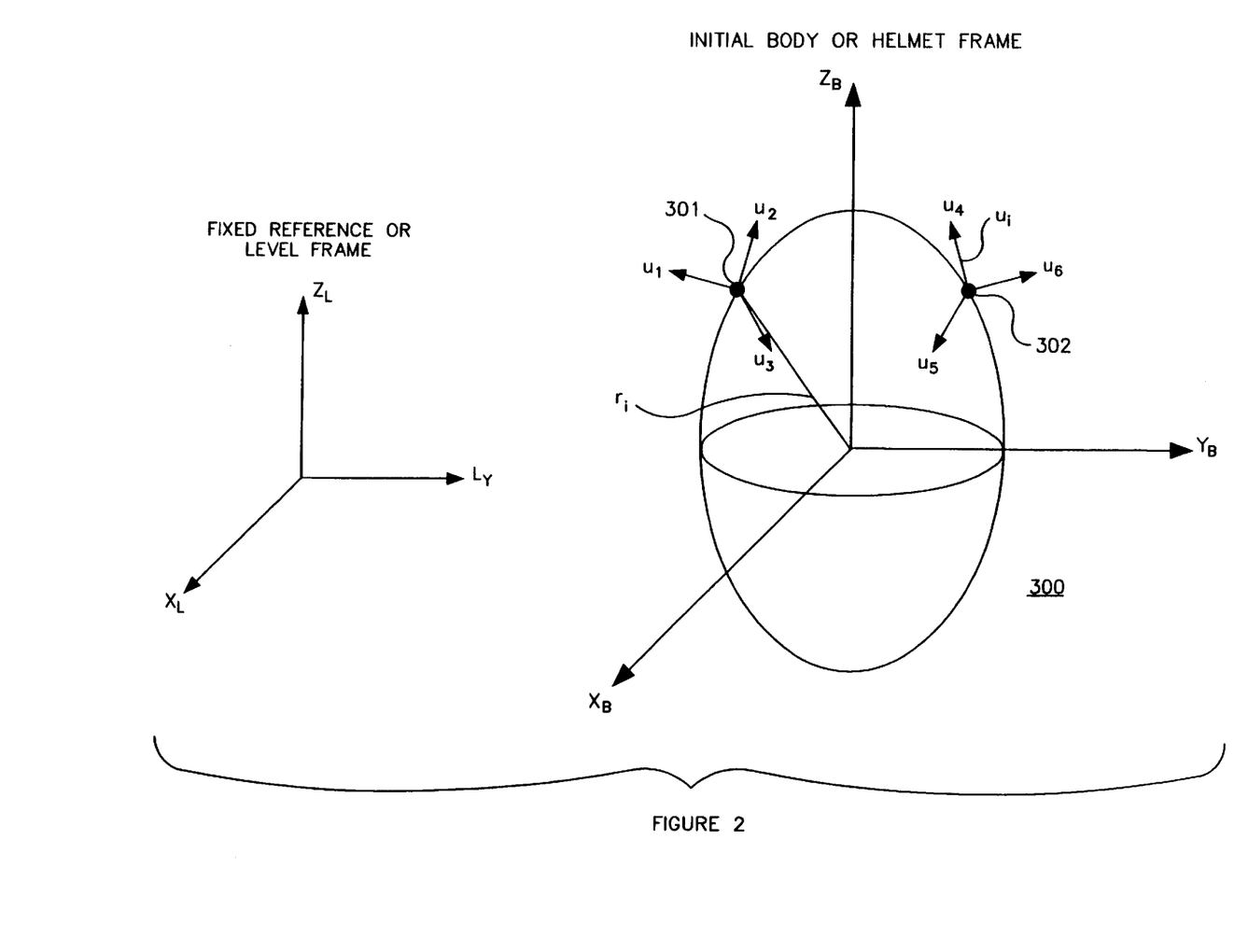
FIG. 2 is graphical drawing showing one embodiment of the tracking system with placement of accelerometers 1–6 in FIG. 1 on two mounting points.

In FIG. 2, two accelerometer mounting points 301 and 302 are located on object 300 (e.g., two locations on a head-mounted display (HMD) unit, or two locations on the wrist of a data glove). Object 300 may be, for example, a head-mounted display unit, a wristband/data glove, or other similar device attached to a user to monitor the user's movement. In this example, each mounting point 301, 302 contains three accelerometers (e.g., accelerometers 1–3 and 4–6 respectively). Vectors $r_1$–$r_6$ ($r_i$) are the vectors from the origin of object 300 (e.g., head of user) to each accelerometer 1–6, respectively, measured in body frame coordinates $x_B$, $y_B$, $z_B$ (e.g., coordinates in reference to object 300). In one embodiment, accelerometers 1–6, and thus vectors $r_1$–$r_6$, are fixed when accelerometers 1–6 are mounted. However, the location of accelerometers 1–6 could be altered during the use of the tracking system and vectors $r_1$–$r_6$ updated accordingly. As shown in FIG. 2, $r_1 = r_2 = r_3$ and $r_4 = r_5 = r_6$ because there are only two mounting points 301, 302.

Vectors $u_1$–$u_6$ ($u_i$) represent the sensitive direction of each accelerometer 1–6, respectively, measured in body frame coordinates $x_B$, $y_B$, $z_B$. Similarly, sensitive direction vectors $u_1$–$u_6$ are generally fixed when accelerometers 1–6 are mounted but could be altered and updated accordingly.

Figure 2A:
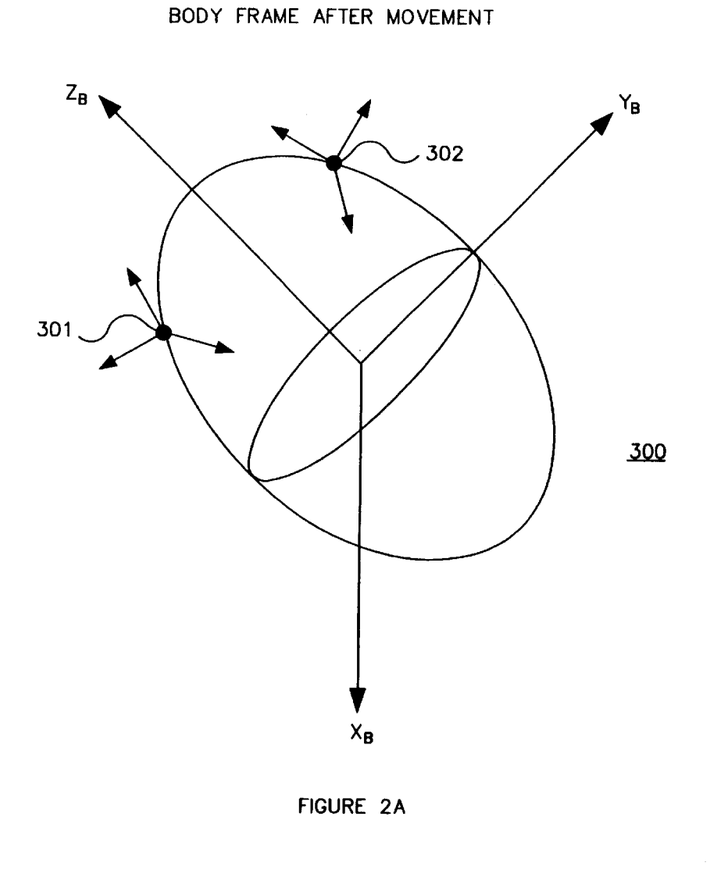
FIG. 2A is a graphical drawing showing object 300 of FIG. 2 after movement.

Position and orientation information 130 is reported in a fixed, or level frame reference defined by $x_L$, $y_L$, $z_L$. The coordinate system used in a virtual reality program or computer simulation environment 180, for example, is a level frame reference. After movement of object 300, body frame references are changed as shown in FIG. 2A.

Figure 3:
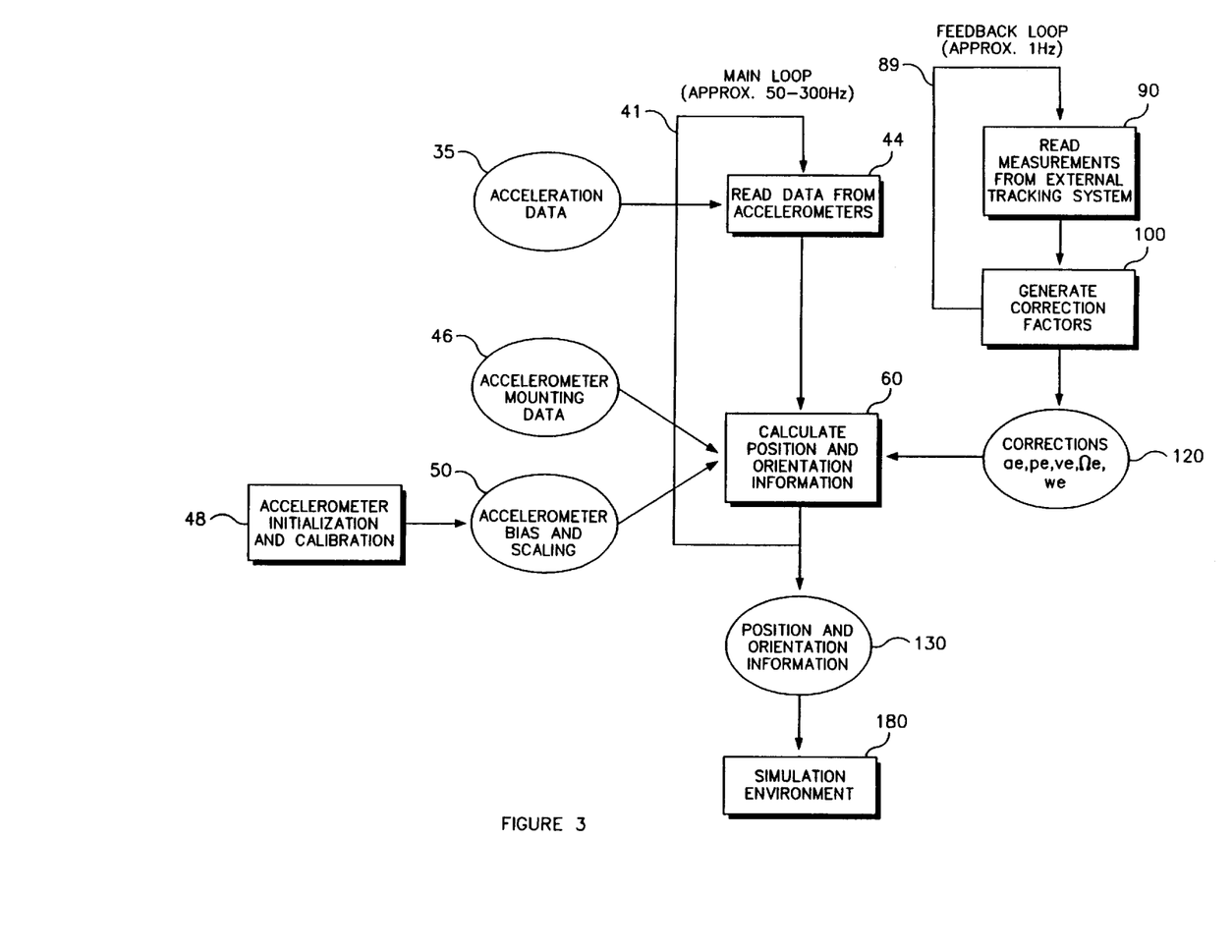
FIG. 3 is a simplified flow chart depicting one embodiment of the tracking system of the present invention.

Accelerometer mounting information 46 (FIG. 3) comprises the information in the matrix J (described in the program flow below) defined by:

$$J = inv \begin{vmatrix} |u_1^T (r_1 \times u_1)^T| \\ |u_2^T (r_2 \times u_2)^T| \\ |\ldots| \\ |u_6^T (r_6 \times u_6)^T| \end{vmatrix}$$

The matrix J resolves the net linear accelerations into linear body and angular components. Accelerometers 1–6 must be mounted (e.g., 301, 302) such that the matrix J is not singular. For example, accelerometers 1–6 cannot all be placed in one position $r_i$. Similarly, $u_i$, representing the acceleration sensitive directions, must be non-zero for each acceleration direction $x_B$, $y_B$, $z_B$. (e.g., the $x_B$ component of every $u_i$ cannot always be zero). In one embodiment, $u_1$, $u_2$, and $u_3$ are orthogonal and $u_4$, $u_5$, and $u_6$ are orthogonal.

FIG. 3 shows a simplified flow chart of tracking system 15 as implemented on tracking processor 40. Accelerometer initialization and calibration 48 is initiated prior to each system use to correct for the bias and scaling factors of the accelerometers due to such factors as time, temperature, mechanical jarring and the like. Accelerometers 1–6 are initialized 48 by loading the values of the accelerometer biases which are pre-specified at the factory or obtained from accelerometer specifications. Calibration 48 of accelerometers 1–6 is accomplished by running tracking system 15 while the object to be tracked 300 (e.g., head-mounted display (HMD) on a user) remains stationary. Position and orientation 130 are calculated according to the present invention as specified herein. Feedback filter loop 89 (discussed below, see also *Digital and Kalman Filtering* by S. M. Bozic, John Wiley and Sons, New York) compares calculated position and/or orientation measurements 130 with the known position and/or orientation measurement (known to be stationary) and uses discrepancies between the two measurements to solve for bias and scaling factors 50 for each accelerometer 1–6. Tracking system 15 is operated such that main loop 41 is executed multiple times (approximately 15–20) for a successful calibration 48. Total calibration time is dependent on tracking processor 40 speed. In one embodiment, tracking system 15 alerts the user when calibration 48 is complete. Notification is through, for example, a small LED on an HMD, visual notification on a display, or any other suitable means. For more accurate initial bias and scale factors 50, calibration 48 is repeated with object 300 in several different orientations. Initialization 48 also includes resetting correction factors 120 ($p_e$, $v_e$, $\Omega e$, we) to zero or their reference values. Reference values may be dictated, for example, by simulation environment 180.

In main loop 41 tracking processor 40 reads 44 acceleration data 35 from accelerometers 1–6 and calculates 60 position and orientation information 130. Calculation 60 is discussed in more detail with reference to FIG. 4 below. In operation, main loop 41 is repeated at 50–300 Hz or faster depending on hardware capability (e.g., capability of tracking processor 40 or other components in FIG. 1). A fast loop rate 41 ensures that simulation environment 180 is updated with current position and orientation information 130.

Feedback loop 89 (also known as a Kalman filter) comprises reading tracking measurements 90 (e.g., position, orientation, and/or velocity) from external tracking system 170 (FIGS. 6, 7) disposed relative to object 300 and generating 100 correction factors 120. Generation 100 of the correction factors 120 is described in more detail with reference to FIG. 5 below. Correction factors 120 are used in calculation 60 of position and orientation information 130.

If the volume in which object 300 moves is relatively large compared to the size of object (e.g., tracking an HMD in a 5×5 meter room) or the system is used for long periods of time (e.g., over 15 minutes), then external measurements 90 from, for example, external tracking system 170 are used for feedback. External tracking system 170 is a conventional tracking system using, for example, radar, sonar, infrared, optical, acoustic/ultrasonic, or magnetic tracking technology. External tracking data including position, orientation, and/or velocity measurements 90 are provided in the form of a 1- to 2-dimensional update or a full 3-dimensional, 6 degree of freedom, update. Basically, feedback loop 89 will use any additional tracking data about object 300 to correct position and orientation information 130—more tracking data will provide a better correction.

Alternatively, if object 300 (e.g., HMD) is confined to a small volume (e.g., seated), then certain "software specification" information (not shown) in simulation environment 180 can be used in place of measurements 90 as input to generation 100 of correction factors 120. For example, the mean position and the estimated variance of object 300 in a limited volume can be used for measurements 90. The variance can be constant or change over time. The variance reflects the uncertainty or size of the volume the object 300, or user, is confined.

After incorporating correction factors 120 from feedback filter loop 89, the output of calculation 60 is position and orientation information 130. Position and orientation information 130 is used, for example, in a virtual reality program or simulation environment 180.

Figure 4:
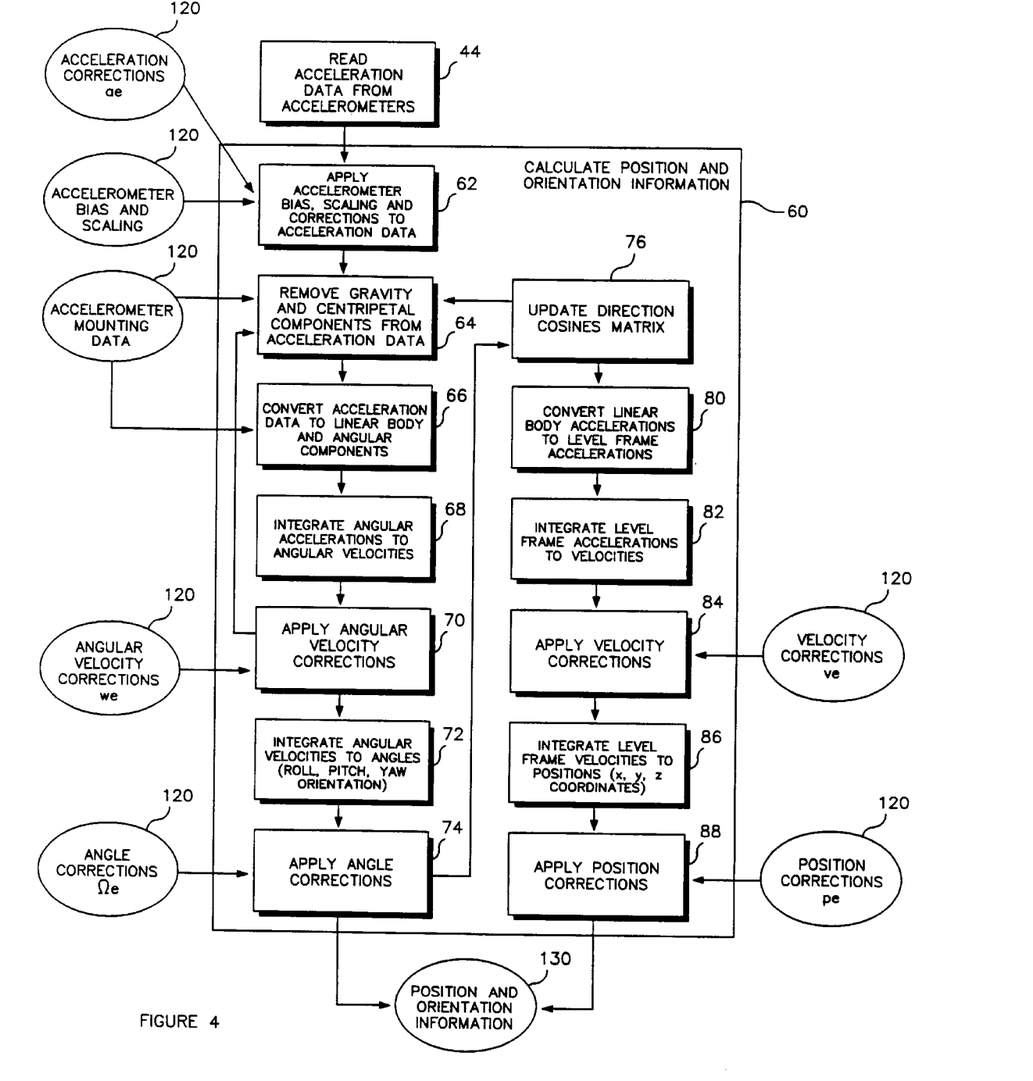
FIG. 4 is a flow chart depicting main loop 41 in FIG. 1.

In FIG. 4, tracking processor 40 reads 44 acceleration data 35 from each accelerometer 1–6. Accelerometer bias and scaling factors 50 are applied 62 to acceleration data 44. Acceleration corrections 120 from feedback loop 89 are also applied 62 to acceleration data 44. Gravity and centripetal components of acceleration are also removed 64 from corrected acceleration data 62. Step 64 involves information from the prior output of the direction cosine matrix 76, mounting data ($r_i$ and $u_i$) 46, and angular velocities 70. Modified acceleration data 64 is converted to linear body and angular components 66. (There is no designation of body, level, or reference frame for angular accelerations, they simply measure the angle between two axes.) Angular accelerations 66 are integrated to angular velocities 68. Angular velocity corrections 120 from feedback loop 89 are applied 70 to angular velocity data 68. Corrected angular velocities 70 are integrated to angles or orientation 72, for example, roll, pitch, and yaw. Angular corrections 120 from feedback loop 89 are applied 74 to corrected angle data 72. Thus, orientation information 130 is produced. Direction cosine matrix is updated 46 using a conventional direction cosine update routine. (See, for example, Paul G. Savage, *Strapdown Systems Algorithms,* in *Advances in Strapdown Inertial Systems,* NATO Advisory Group for Aerospace Research and Development Lecture Series #133, 1984, pp. 3-1 to 3-30).

Linear body accelerations 66 are converted to level frame or reference frame (e.g., simulation environment coordinates) accelerations 80. Level frame accelerations 80 are integrated to level frame velocities 82. Velocity corrections 120 from feedback loop 89 are applied 84 to level frame velocities 82. Corrected level frame velocities 84 are integrated to positions 86. Position corrections 120 from feedback loop 89 are applied 88 to positions 86. Thus, position information 130 is produced.

In a preferred embodiment, orientation is calculated (steps 68, 70, 72, 74, 130) and direction cosines matrix is updated 76 before position is calculated (steps 80, 82, 84, 96, 88, 130). This control flow has the advantage that direction cosines matrix 76 is more current and accurate for the position calculation steps. Alternatively, orientation calculation (steps 68, 70, 72, 74, 130) and position calculation (steps 80, 82, 84, 96, 88, 130) can be processed in parallel. However, direction cosines matrix 76 will reflect data from the previous loop 41, thus position calculation 130 may be less accurate.

In a preferred embodiment, calculation 60 also performs an estimation of position and orientation 130 one "frame delay" into the future. The reason for this predictive step, for example, is that simulation environment 180 will take some time, t, to utilize position and orientation information 130 and modify virtual reality program or simulation environment for presentation to the user (e.g., draw the next frame in a video application). Delay time, t, is dependent upon the frame update rate used in simulation environment 180 (e.g., 30 frames per second). Hence, position and orientation information 130 should account for delay time, t. The estimated angle one frame delay into the future is corrected angle 74 plus delay time t multiplied by corrected angular velocity 70. This is sometimes called straight line or linear interpolation. Similarly, estimated position one frame delay into the future is corrected position 88 plus delay time t multiplied by corrected velocity 84. Thus, predictive position and orientation information can also be generated 130. Delay time, t, is highly dependent on the simulation software 180, thus the delay time parameter should be loaded into the system on every use.

It is possible for simulation software 180 to estimate future position and orientation. Generally, the difference between the last two position measurements 130 is used to obtain a velocity. However, differencing or differentiating are a processes susceptible to noise and lead to a poor estimation. The invented system provides a simple and efficient method for providing estimation 130.

Figure 5:
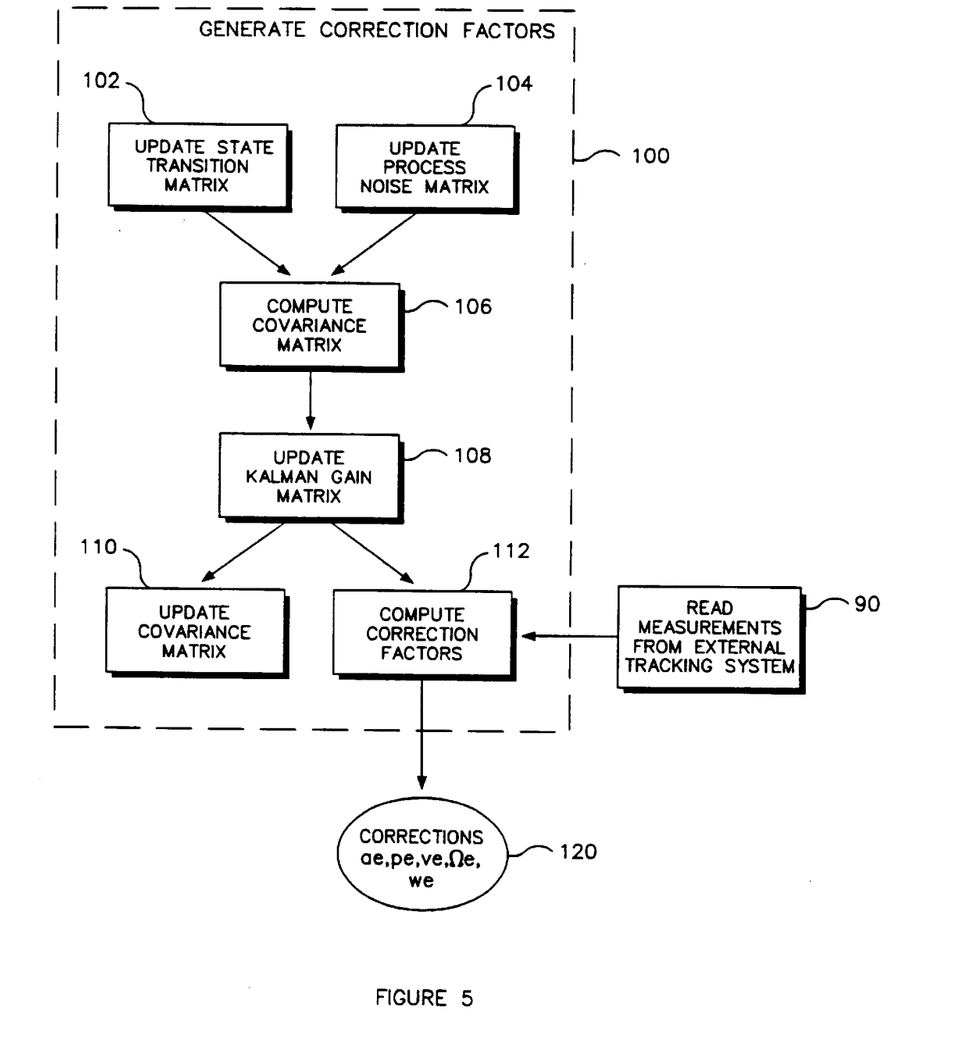
FIG. 5 is a flowchart depicting feedback loop 89 in FIG. 1.

Referring now to FIG. 5, state transition matrix 102 and process noise matrix 104 are updated (see use of these matrices in program flow below). State transition matrix 102, F, is a function of the state of the system represented as a matrix, X, at the nth computer cycle and the (n+1)th computer cycle such that $X(n+1)=F(n)\ X(n)$. Process noise matrix 104, Q, is the expectation of the dot product of the vectors that represent the noise of each element in the state vector of the system. In the simplest case Q is a constant diagonal matrix—each element of the diagonal representing the variance of that element. However, if the sensors are modeled in a time dependent manner, for example in a Markov process, then Q will vary with time. These conventional matrices are discussed, for example, in *Applied Optimal Estimation* by the Technical Staff of The Analytic Sciences Corporation, ed. Arthur Gelb, MIT Press, 1974, pp. 102–156.

Covariance matrix is computed 106 as a function of state transition matrix 102 and process noise matrix 104. Feedback or Kalman gain matrix is updated 108 as a function of covariance matrix 106. Correction factors 120 ($p_e$, $v_e$, $\Omega e$, we) are computed 112 as a function of Kalman gain matrix 108 and measurements 90 from external tracking system 170 (or software specification data). External tracking system 170 is a conventional tracking system using, for example, radar, sonar, infrared, optical, acoustic/ultrasonic, or magnetic tracking technology. External position, orientation, and/or velocity measurements 90 are provided in the form of a 1- to 2-dimensional update or a full 3-dimensional, 6 degree of freedom update. Covariance matrix is updated 102 as a function of Kalman gain matrix 108.

Figure 6:
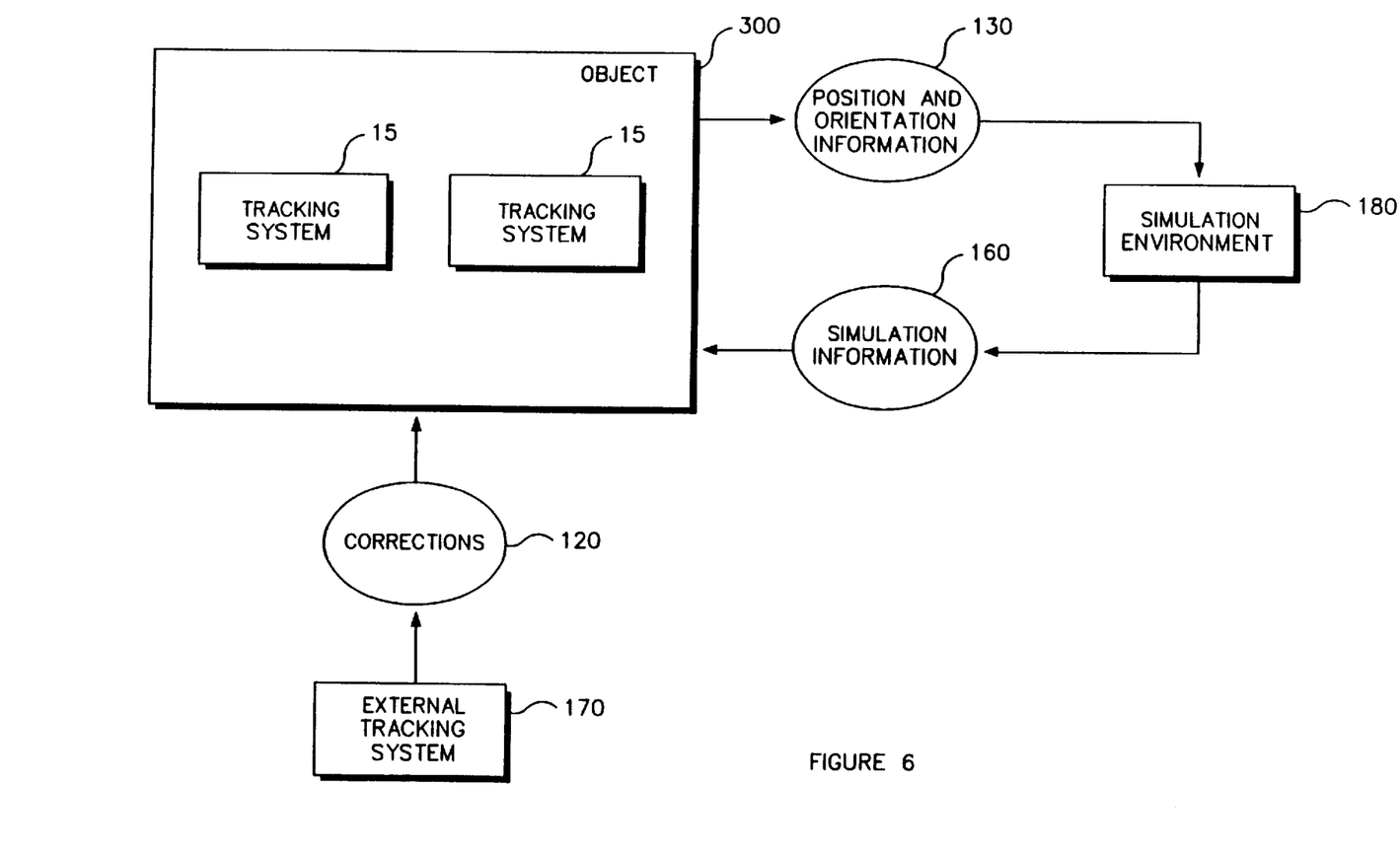
FIG. 6 is a simplified block diagram of a virtual reality invention using the tracking system of the present invention.

Referring now to FIG. 6, one embodiment of a virtual reality invention is shown. Mounted on object 300 is tracking module(s) 15. In one embodiment, tracking system 15 is two or more tracking modules. For example, two triaxial tracking module 15 can be mounted on object 300 (e.g., an HMD) according to the mounting diagram shown in FIG. 2. Position and orientation information 130 is generated according to the tracking invention (see FIGS. 3–5) and is transmitted to simulation environment 180. Simulation environment 180 outputs simulation information 160 such as video, audio, tactile, force, or olfactory signals, possibly modified as a function of position and orientation information 130 received. Simulation information 160 is received by object 300, or other display device, and is used, for example, to display video or play audio for the user. External tracking system 170 relative to object 300 provides corrective or feedback data 120 to tracking system 15. Correction data 120 is used to modify position and orientation information 130 as disclosed above with reference to FIGS. 3–5.

Figure 7:
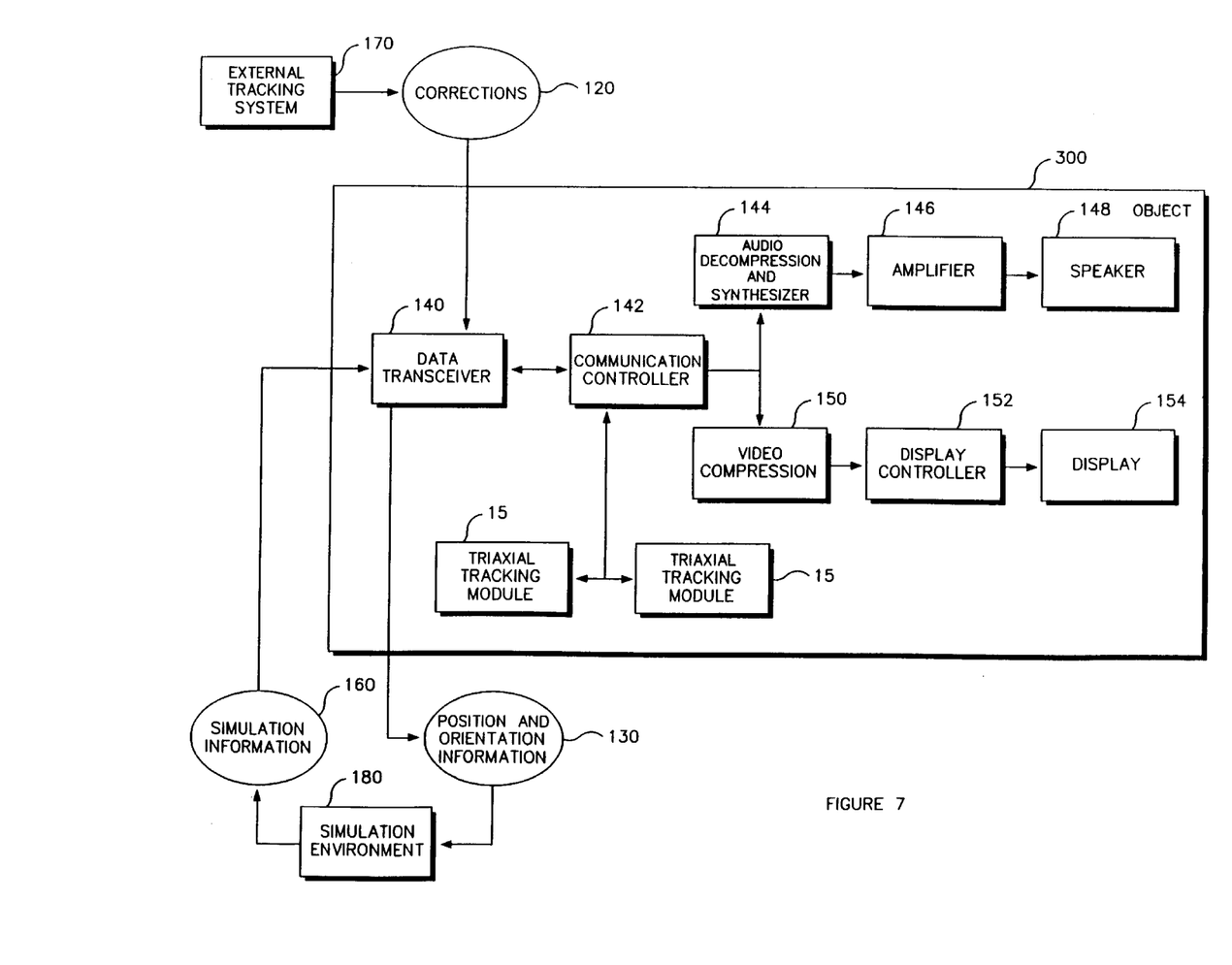
FIG. 7 is a block diagram of object 300 in FIG. 6.

FIG. 7, is one embodiment of object 300 (e.g., an HMD unit) shown in FIG. 6. Data transceiver or sensor 140 is, for example, an infrared, low frequency radar, optical, acoustic (ultrasonic), or magnetic sensor. In a preferred embodiment, data transceiver 140 is an infrared (IR) or other wireless transceiver capable of transmitting up to 4 Mb/s such as the Spectrix SpectrixLite data transceiver. A wireless transceiver is less cumbersome and does not interfere significantly with the user's movement. Generally, external tracking system 170 need only provide a 1 to 2 dimension position update 120 at a low frequency (e.g., 1 Hz) in order for tracking systems 15 on object 300 to function with sufficient accuracy. Thus, if sensor 140 is capable of operating at a higher frequency (e.g., 50–300 Hz) sensor 140 is unused for a large portion of time. During this free time, sensor 140 can be used for another purpose. For example, if sensor 140 is an IR data transceiver operating at 50–300 Hz, transceiver 140 can be used to transmit and receive simulation information 160 from simulation environment 180.

Data transceiver 140 is coupled to communication controller 142. Communication controller 142 is, for example, a processor such as the DSP 2100 by Analog Devices that can manage the organization and timing of, for example, three data streams, namely, (1) compressed audio information 160 received from simulation environment 180, (2) compressed video information 160 received from simulation environment 180, and (3) position and orientation information 130 received from tracking systems 15. Communication controller 142 ensures that each of the signals is properly received and transmitted from data transceiver 140. Communication controller 142 may also convert serial data from transceiver 140 to the parallel format of, for example, modules 144, 150, and 15 which it is coupled to.

Audio decompression and synthesizer 144 decompresses and synthesizes analog audio signals 160 as commonly known in the art. Such a device is embodied in, for example, Analog Device's AD1848. Audio signals of 144 (e.g., left and right stereo channel signals) are amplified by amplifier 146. The amplified audio signals 146 drive a speaker 148 or speakers (e.g., left and right headphone speakers) for the user. A plethora of conventional audio amplifiers and speakers are available and suitable for this virtual reality invention.

Compressed video stream 160 is decompressed 150 using, for example, the motion pictures expert group (MPEG) standard. In one embodiment, compressed video 160 arrives at approximately 2 Mb/s and is converted to 30 frames per second full motion video in NTSC (National Television Standards Committee) format. The Zoran MPEG Image Compression Module Reference Design, is one embodiment of module 150. Output of 150 connects to display controller 152 which manages, for example a color LCD display or displays (e.g., left and right LCD displays) 154. Displays 154 and their associated optics provide, for example, a high-resolution bi-focal color display. Display controller 152, displays and optics 154 are available, for example, in an integrated unit by Kaiser ElectroOptic VIM (virtual immersion module). A power source (not shown) provides DC power for the electronics shown in FIG. 7.

Figure 8:
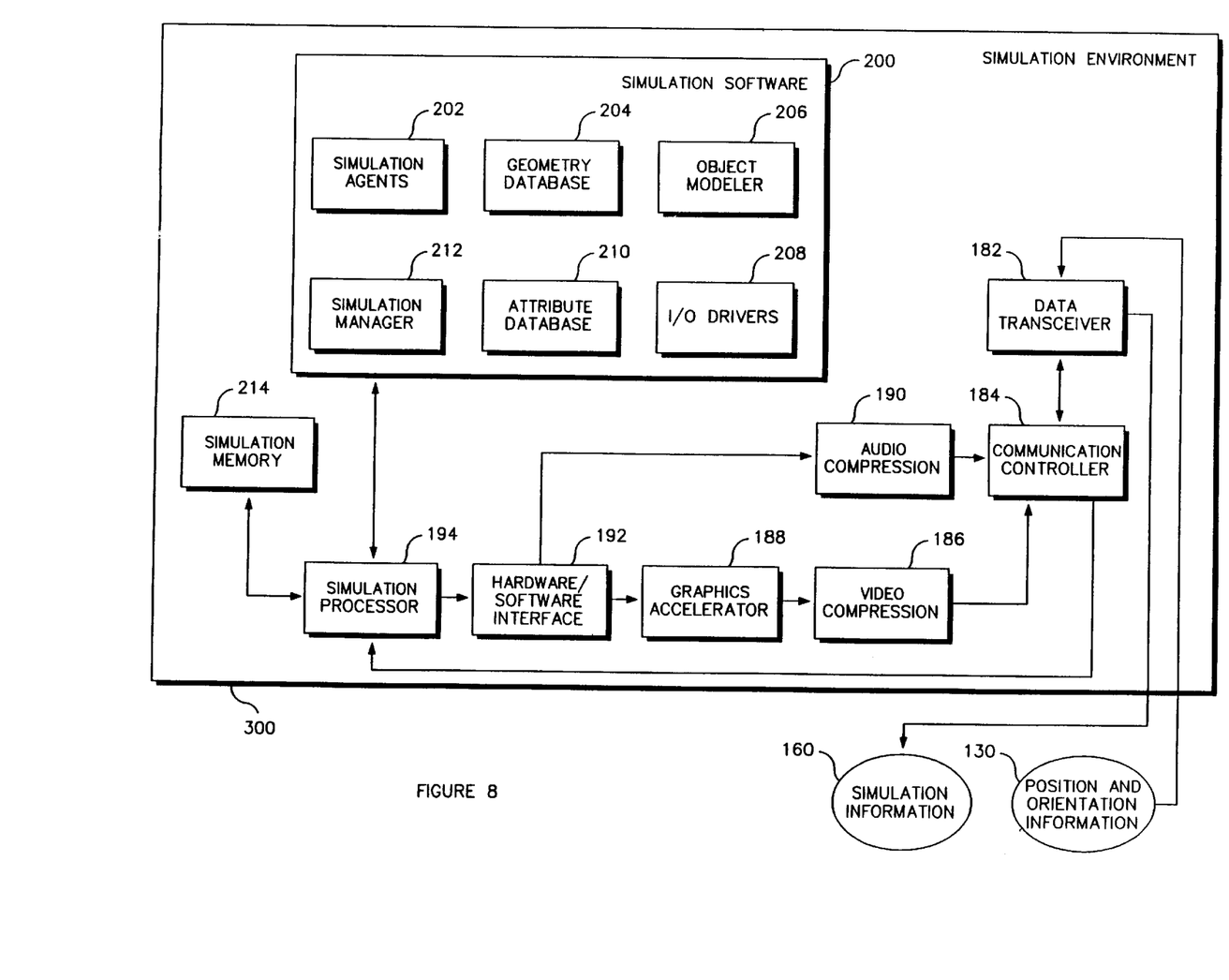
FIG. 8 is a block diagram of simulation environment 180 in FIG. 6.

FIG. 8 is one embodiment of simulation environment, system, or module 180 shown in FIG. 6. In one embodiment, simulation software 200 may comprise several software components that interact with each other and with external hardware. Geometry database 204 contains information on various simulation objects that appear in the simulation (e.g., cars, people, spaceships). Attributes of the various simulation objects are stored in attribute database 210. Attributes 210 describe the kind of interactions each simulation object can have within the environment. Attributes may be, for example, visual, motion, audio, force, and/or smell. For example, an audio attribute may be the audio signal 210 a simulated car should generate when the car is running. Object modeler 206 assists in rendering simulation objects in a 3-dimensional view. Input/output (I/O) drivers 208 interface with external hardware, for example, audio, visual, tactile, force, or olfactory units. I/O drivers may also monitor and/or query tracking system 15 for the position and orientation of object 300. Simulation agents 202 provide the simulation with a story line. Simulation agents 202 define the reactions or steps that various objects should take in response to user actions (e.g., via the object 300 being tracked). For example, a simulation agent 202 would tell a simulated car to stop running if the user provides an instruction to turn the car off (e.g., by means of a joystick, data glove, or other input). Simulation manager 212 coordinates the activities and actions of the components of simulation software 200.

Simulation processor 194, which may be connected to other processors 194, executes simulation software 200. Simulation processor 194 can be a standard computer microprocessor such as an INTEL 486 or Pentium-based microprocessor. Simulation memory unit 214 is coupled to simulation processor 194 and is used for storing program instruction steps and storing data for execution by tracking processor 194. Simulation memory unit 214 is a conventional computer memory unit such as a magnetic hard disk storage unit or random access memory (RAM) on a chip. Simulation processor 194 receives position and orientation information 130 from object 300 (e.g., HMD) via data transceiver 182 and communication controller 184. Simulation processor sends instructions, data, or signals to hardware/software interface 192 (or directly sends instructions to hardware devices). These signals may be affected or modified as a function of position and orientation information 130.

Coupled to simulation processor 194 is hardware/software interface 192 which interacts with various simulation hardware devices. For example, audio data or signals may be compressed 190 before being routed to communication controller 184 and transmitted via data transceiver 182 to an audio device or object 300 (e.g., HMD). Similarly, video signals are sent to graphics accelerator 188 and compressed 186 (e.g., MPEG compression) before being routed to communication controller 184 and transmitted via data transceiver 182 to a display device or object 300 (e.g., HMD). In this example, communication controller 184 manages the organization and timing of three data streams, namely, (1) compressed audio received from 190 to transmit to object 300, (2) compressed video received from 186 to transmit to object 300, and (3) position and orientation information received from object 300 in conjunction with tracking systems 15 via data transceiver 182.

Minimally, simulation environment, system, or module 180 comprises simulation software 200, simulation processor 194, and simulation memory 214.

The following tables of constants and variables and a high-level system flow further describe one embodiment of the invention. The example herein is not intended to limit the scope of the claims in any way.

TABLE 1

CONSTANTS - MAIN LOOP

| Symbol | Dimension | Description |
|---|---|---|
| T | Scalar | Update period for main loop. 0.01 seconds |
| $T_D$ | Scalar | Update rate of simulation software. Typ. 1/30 sec. |
| B | N/A | Body or helmet coordinate frame |
| L | N/A | Room or chair coordinate frame. Also referred to as Level or Reference frame. |
| i | Scalar | 1,2, . . . ,6 accelerometer number . . . see schematic |

TABLE 1-continued

CONSTANTS - MAIN LOOP

| Symbol | Dimension | Description |
|---|---|---|
| J | 6 × 6 | Matrix that separates corrected accelerometer readings into linear and angular components. Element values defined from locations and directions accelerometers are mounted. |
| r(i) | 3 × 1 | Radius vector that points from origin of body frame to sensor. Measured in body frame coordinates |
| u(i) | 3 × 1 | Unit vector in direction of sensitive axis of 'i'th accelerometer. Measured in body frame coordinates |
| T | N/A | Transpose operator. Converts column vector to row vector |
| sf(i) | Scalar | Scale factor. Value converts the voltage read from the A/D converter into acceleration in m/s$^2$ |

TABLE 2

VARIABLES - MAIN LOOP

Each variable takes on a new value during the main loop cycles (i.e., the value of each variable is a function of 'n' the main-loop iterator)

| Symbol | Dimension | Description |
|---|---|---|
| n | Scalar | Iteration number of the main loop. |
| a(i) | Scalar | Acceleration reading from the 'i'-th sensor |
| v(i) | Scalar | Voltage reading from A/D converter |
| $a_B$ | 3 × 1 | Body frame linear acceleration vector - describes the linear acceleration of the body frame measured in body frame coordinates |
| $a_L$ | 3 × 1 | Linear acceleration of body frame measured in level / reference frame coordinates |
| $v_L$ | 3 × 1 | Velocity of the body frame measured in level / reference frame coordinates |
| pL | 3 × 1 | Position of origin of body frame in level /reference frame coordinates |
| dw | 3 × 1 | Angular acceleration of the body frame. Note that angular acceleration, velocity, and angle are not referenced to a body or level frame. They measure the angle between the axis of the two frames. |
| w | 3 × 1 | Angular velocity of the body or the reference values in the body frame and level frame axes; often referred to as Euler angles or (Roll, Pitch, Yaw) |
| $C_{LB}$ | 3 × 3 | Matrix of Direction Cosines. Relates quantities measured in the body frame to the level frame |
| ae | 6 × 1 | Raw acceleration corrections from last Kalman filter update. Applied directly to acceleration readings |
| ve | 3 × 1 | Linear velocity corrections from last Kalman filter update |
| pe | 3 × 1 | Position corrections from last Kalman filter update |
| we | 3 × 1 | Angular velocity corrections from last Kalman filter update |
| Ωe | 3 × 1 | Angle corrections from last Kalman filter update |

TABLE 3

CONSTANTS - FEEDBACK FILTER LOOP

| Symbol | Dimension | Description |
|---|---|---|
| $T_K$ | Scalar | Update Rate of Kalman Filter - 1 second |
| H | 1 × 18 or 3 × 18 or 6 × 18 | Observation/Measurement matrix. Each diagonal element is either a 1 or 0. The elements on the diagonal correspond to states in state vector. The value is 1 if that state is measured during the Kalman filter update. |

TABLE 3-continued

CONSTANTS - FEEDBACK FILTER LOOP

| Symbol | Dimension | Description |
|---|---|---|
| R | 3 × 3 | Variance of measurement. In this context measurement refers to the external data (either external tracker data or constraint information). The matrix is 3 × 3 if the external measurements consists of x,y,z. The variance may also be modeled in a time dependent manner. |
| − | N/A | Indicates that this is the value of variable before measurement comparison in Kalman Filter Loop |
| + | N/A | Indicates that this is the value of variable after measurement comparison in Kalman Filter Loop |

TABLE 4

VARIABLES - FEEDBACK LOOP

These variables take on new values during each Kalman filter iteration. Some variables change their value twice during the loop. Kalman filter iterations are counted by the variable 'k'.

| Symbol | Dimension | Description |
|---|---|---|
| X | 18 × 1 | State Vector. Consists of the following components from the main loop (pL, vL, Ω, w, a(1) . . . ,a(6)) |
| P | 18 × 18 | Covariance Matrix |
| F | 18 × 18 | State Transition Matrix. The values describe how error propagates from one variable in the main loop to another. |
| Q | 18 × 18 | Process noise matrix. |
| K | 18 × 3 | Kalman filter gain matrix. These gains control the values of the corrections ae, ve, pe, we, Ωe. The matrix is 18 × 3 if the measurements consist of x,y,z update. |

System Flow- MAIN LOOP

```
/* increase update counter */
n = n + 1
/*read accelerometer data */
for i = 1 to 6
    /* get new data from A/D converter */
    read v(i)
    /* convert voltage to accleration */
    a(i) = sf(i)v(i)
    /* apply accelerometer bias correction from Kalman Filter */
    a(i) = a(i) − ae(i,k)
    /* remove gravity and centripetal components */
    /* cross indicates vector cross product */
    a(i) = a(i) − u(i)$^T$C$_{LB}$(n − 1)g$_L$ − u(i)$^T$(cross(w,cross(w,r(i))))
end
/* convert net accelerations into linear body and angular
components */
```

$$\begin{bmatrix} a_B \\ w \end{bmatrix} = (J^*) \begin{bmatrix} a(1) \\ \cdot \\ \cdot \\ \cdot \\ a(6) \end{bmatrix}$$

```
/* NOTE all integrations use Trapezoidal Approximation */
/* integrate angular accelerations to angular velocity */
w(n) = 0.5 T * (dw(n) + dw(n−1)) + w(n−1)
/* apply correction from Kalman filter */
w(n) = w(n) − we(k)
/* integrate angular velocities to angles */
Ω(n) = 0.5T*(w(n) + w(n−1)) + Ω(n−1)
/* apply correction from Kalman filter */
Ω(n) = Ω(n) − Ωe(k)
```

-continued

System Flow- MAIN LOOP

```
/* update directions cosine matrix using any one of
several conventional algorithms for updating direction
Cosine matrices. Seereference above. Some algorithms
may combine this step with integration of angular
velocity to angle.
*/
C_LB(n) .. function of Ω(n), C_LB(n - 1)
/* convert body frame accelerations to level/reference frame
acceleration */
a_L(n) = C_LB(n)a_B(n)
/* integrate level frame accelerations velocities */
v_L(n) = 0.5T*(a_L(n) + a_L(n-1)) + v_L(n-1)
/* apply correction from Kalman filter */
v_L(n) = v_L(n) - ve(k)
/* integrate level frame velocities to position */
p_L(n) = 0.5T*(v_L(n) + v_L(n-1)) + p_L(n-1)
/* apply correction from Kalman filter */
p_L(n) = p_L(n) - pe(k , j)
/* transmit updated position and orientation using format defined
in claim-x */
Transmit (p_L, Ω)
/* Optional: the position and orientation may be reported for
one "frame delay" into the future. Whether or not to do this will
depend on the simulation software. Currently simulation handles
this process internally. However the invented tracking system
provides a natural way to perform extrapolation */
Transmit (p_L + v_L * T_D, Ω + w * T_D)
```

System Flow - FEEDBACK LOOP

```
/* Update State Transition Matrix */
Compute F(k-1,k)
/* Update Process Noise Matrix */
Compute Q(k-1,k)
/* Compute Covariance Matrix (before measurement) */
P⁻(k) = F(k-1,k) *P⁺(k-1)*F(k-1,k)ᵀ + Q(k-1,k)
/* Update Kalman Gain Matrix */
K(k) = P⁺(k-1)Hᵀ / [HP⁺(k-1)Hᵀ + R]
/* Compute Correction factors */

⎡ pe ⎤
⎢ ve ⎥
⎢ Ωe ⎥ = -K(k) * [Measurements - Estimated State]
⎢ we ⎥
⎣ ae ⎦

/*"Measurements" refer to data from an external source, and
Estimated State is position and orientation information 80. When
the system uses constraints defined in software the measurements
are zero for position and linear velocity. The diagonal elements of
R are very large, typically (0.3 m)² = 0.09 m² for position, and
(0.1 m/s)² = 0.01 m²/s² for linear velocity. The observation matrix
H is set so that all diagonal elements are zeros except position and
linear velocity, (and in some cases angle) which are set to 1.*/
/* Update Covariance Matrix Using measurement */
P⁺(k) = P⁻(k) - K(k)(P⁻(k)Hᵀ)ᵀ
```

We claim:

1. A method for generating computer simulation signals in response to orientation of a moveable object from a plurality of electronic linear accelerometers mounted on the moveable object, the method comprising the steps of:

processing linear acceleration signals generated from a plurality of electronic linear accelerometers mounted on the moveable object; and generating orientation signals associated with movement of the object in three degrees of freedom as a function of the linear acceleration signals; and generating computer simulation signals in response to the orientation signals.

2. The method of claim 1 wherein the orientation signals include an estimated future orientation signal, and the step of generating orientation signals further comprises the step of:

determining an estimated future orientation signal as a function of the orientation signals and a delay time.

3. The method of claim 1, for operation with another moveable object having a plurality of electronic linear accelerometers mounted thereon, and further comprising the steps of:

processing linear acceleration signals from the plurality of electronic linear accelerometers mounted on said another moveable object;

generating orientation signals associated with movement of said another moveable object in three degrees of freedom as a function of the acceleration signals associated with said another moveable object; and generating computer simulation signals in response to the orientation signals associated with said another moveable object.

4. The method of claim 1 wherein in the step of:

generating computer simulation signals, the computer simulation signals are generated as a function of the orientation signals.

5. The method of claim 4 wherein the simulation signals comprise video information.

6. The method of claim 4 wherein the simulation signals comprise audio information.

7. The method of claim 4 wherein the simulation signals comprise tactile information.

8. The method of claim 4 wherein the simulation signals comprise sensory information.

9. The method of claim 1 wherein the steps of processing linear acceleration signals, generating orientation signals, and generating computer simulation signals are repeated.

10. The method of claim 1 for operation with a computer simulation system, further comprising the steps of:

transmitting the orientation signals to the simulation system; and generating the computer simulation signals in the simulation system as a function of the orientation signals received thereby.

11. The method of claim 1 further comprising the steps of:

receiving tracking data signals associated with the object from a source disposed from the object; and modifying the orientation signals as a function of the tracking data signals received.

12. A processor-implemented method for operation with a simulation system to generate position signals and orientation signals for tracking object movement, the method comprising the steps of:

receiving acceleration signals from a plurality of accelerometers mounted on a moveable object;

generating position signals and orientation signals associated with movement of the object, wherein a processor determines the position signals and the orientation signals according to the received acceleration signals;

receiving tracking data signals associated with the object from a source disposed on the object;

modifying the position signals and the orientation signals as a function of the tracking data signals received; and the simulation system generates simulation signals as a function of the modified position signals and the modified orientation signals.

13. A processor-implemented method for generating a tracking signal associated with movement of an object having a plurality of accelerometers mounted thereon, the method comprising the steps of:

receiving a selected acceleration signal from the plurality of accelerometers mounted on a moveable object; and generating a tracking signal associated with movement of the object as a function of the received acceleration signal.

14. The method of claim 12 further comprising:

generating simulation signals as a function of the position signals and the orientation signals.

15. A system for generating computer simulation signals in response to the orientation of a moveable object from a plurality of electronic linear accelerometers mounted on the moveable object, the system comprising:

a plurality of electronic linear accelerometers mounted on the moveable object for producing linear acceleration signals;

a processor coupled to the accelerometers for generating orientation signals associated with the moveable object in three degrees of freedom as a function of the linear acceleration signals; and a simulation system communicatively coupled to the processor for generating computer simulation signals as a function of the orientation signals.

16. The system of claim 15 where the system further comprises:

a transmitting for transmitting the orientation signals from the object to the simulation system; and another transmitting for transmitting the simulation signals from the simulation system to the object.

* * * * *